United States Patent
Kasahara et al.

(10) Patent No.: US 6,822,837 B2
(45) Date of Patent: Nov. 23, 2004

(54) THIN-FILM MAGNETIC HEAD AND METHOD OF MANUFACTURING SAME, AND METHOD OF FORMING A PATTERNED THIN FILM FOR A THIN-FILM MAGNETIC HEAD

(75) Inventors: Noriaki Kasahara, Tokyo (JP); Takeo Kagami, Tokyo (JP)

(73) Assignee: TDK Corporation, Tokyo (JP)

(*) Notice: Subject to any disclaimer, the term of this patent is extended or adjusted under 35 U.S.C. 154(b) by 66 days.

(21) Appl. No.: 10/041,637

(22) Filed: Jan. 10, 2002

(65) Prior Publication Data

US 2002/0135951 A1 Sep. 26, 2002

(30) Foreign Application Priority Data

Jan. 19, 2001 (JP) .................................... 2001-011973

(51) Int. Cl.[7] .................................................. G11B 5/39
(52) U.S. Cl. ................................................. 360/324.2
(58) Field of Search ............................ 360/313, 317, 360/324, 324.1, 324.11, 324.12, 324.2; 29/603.07, 603.09, 603.1, 603.12, 603.14, 603.15, 603.16, 603.18; 451/5, 8, 10, 41, 908

(56) References Cited

U.S. PATENT DOCUMENTS

| 4,860,432 | A | * | 8/1989 | Kawata ..................... 29/602.1 |
| 5,678,086 | A | * | 10/1997 | Gandola et al. ............ 396/319 |
| 5,913,550 | A | * | 6/1999 | Watanuki .................... 29/603.1 |
| 6,027,397 | A | * | 2/2000 | Church et al. ................. 451/1 |
| 6,193,584 | B1 | * | 2/2001 | Rudy et al. ..................... 451/5 |
| 6,258,283 | B1 | | 7/2001 | Mikami et al. |
| 6,344,954 | B1 | | 2/2002 | Redon et al. |
| 6,347,983 | B1 | * | 2/2002 | Hao et al. ....................... 451/57 |
| 6,370,763 | B1 | * | 4/2002 | Watanuki et al. ......... 29/603.09 |
| 6,381,107 | B1 | | 4/2002 | Redon et al. |
| 6,532,646 | B2 | * | 3/2003 | Watanuki .................. 29/603.12 |

FOREIGN PATENT DOCUMENTS

| JP | 60-171618 | * | 9/1985 |
| JP | 60-191418 | * | 9/1985 |
| JP | 07-093716 | * | 4/1995 |
| JP | A-9-282615 | | 10/1997 |
| JP | A-10-27318 | | 1/1998 |
| JP | A-11-250417 | | 9/1999 |
| JP | A 11-274600 | | 10/1999 |
| JP | A 2001-6130 | | 1/2001 |
| JP | A 2001-15826 | | 1/2001 |

* cited by examiner

Primary Examiner—David L. Ometz
(74) Attorney, Agent, or Firm—Oliff & Berridge, PLC

(57) ABSTRACT

A lower electrode layer and a lower metallic layer are formed on a substrate, and a TMR multi-layer film is formed thereon. TMR multi-layer film is made up of a lower ferromagnetic layer, a tunnel barrier layer, an upper ferromagnetic layer, a pinning layer and a capping layer. In a region where a terminal is provided, a dummy lower electrode layer and a dummy lower metallic layer are formed on the substrate, and a dummy film is formed thereon. The dummy film has the same film composition as that of the TMR multi-layer film. For defining a shape of a tunnel joint, the capping layer through a halfway point in the lower ferromagnetic layer are selectively etched. In this etching process, the dummy film is also etched at the same time. In the etching process, a measurement for identifying elements scattered from the TMR multi-layer film and the dummy film is performed so as to control a position at which the etching is to be stopped.

12 Claims, 13 Drawing Sheets

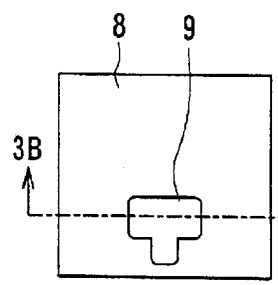
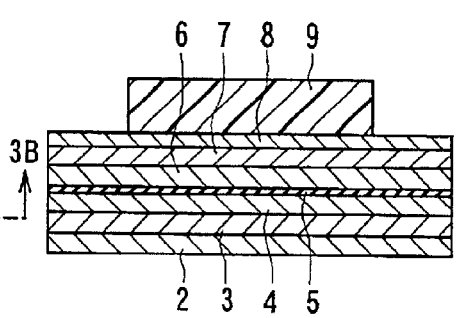
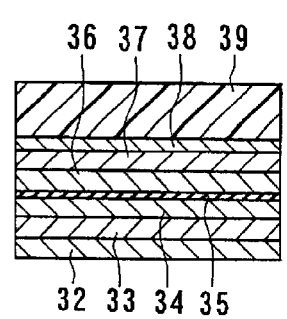
FIG. 3A     FIG. 3B     FIG. 3C
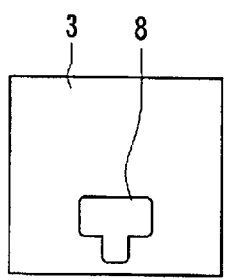
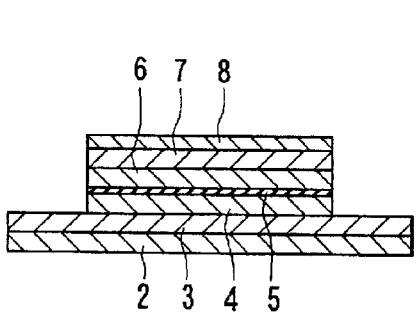
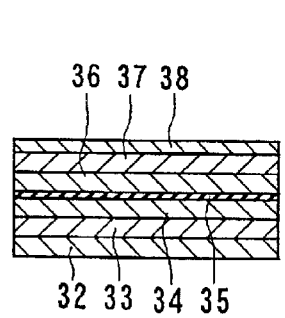
FIG. 4A     FIG. 4B     FIG. 4C
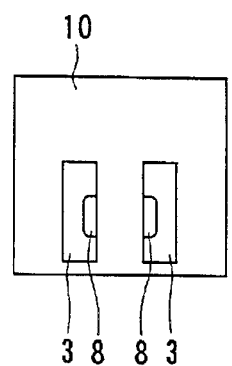
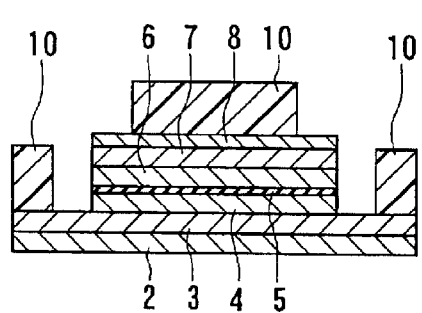
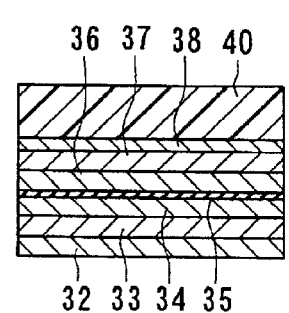
FIG. 5A     FIG. 5B     FIG. 5C

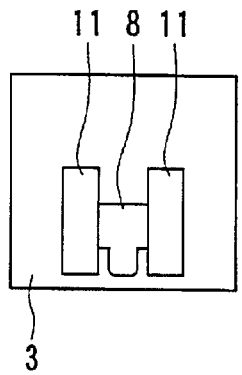 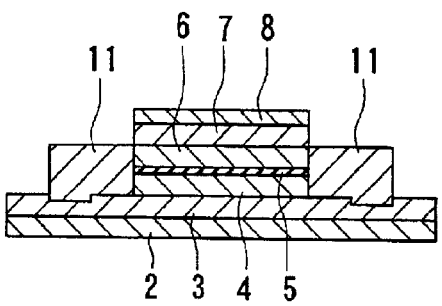 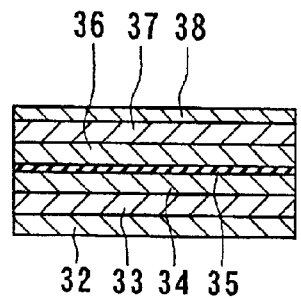
FIG. 6A  FIG. 6B  FIG. 6C
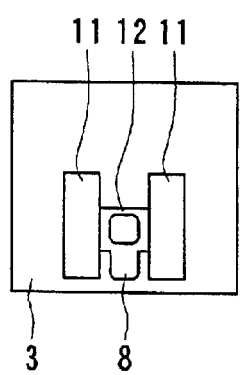 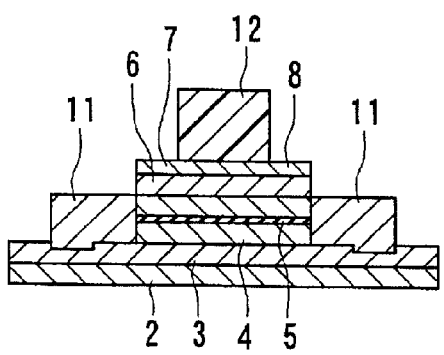 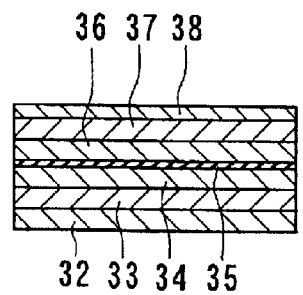
FIG. 7A  FIG. 7B  FIG. 7C
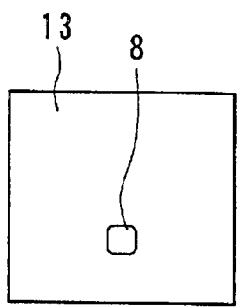 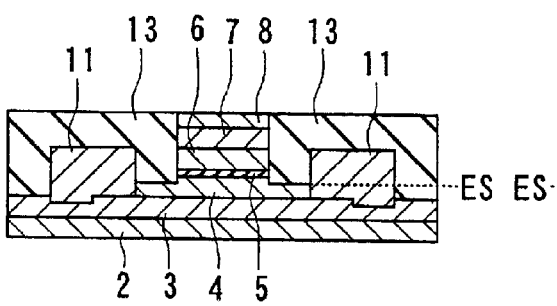 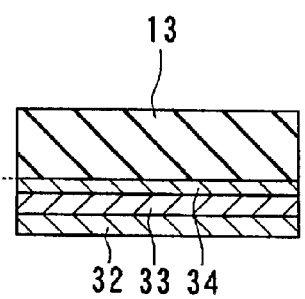
FIG. 8A  FIG. 8B  FIG. 8C

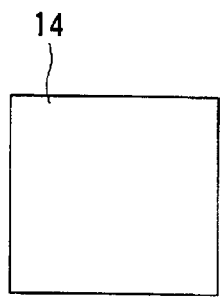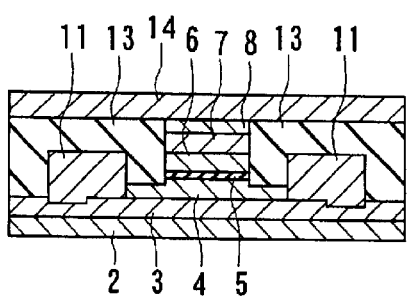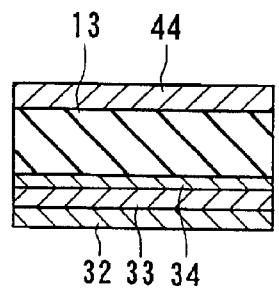
FIG. 9A     FIG. 9B     FIG. 9C
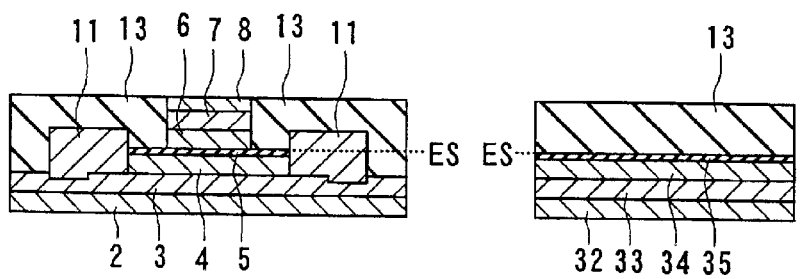
FIG. 10A     FIG. 10B
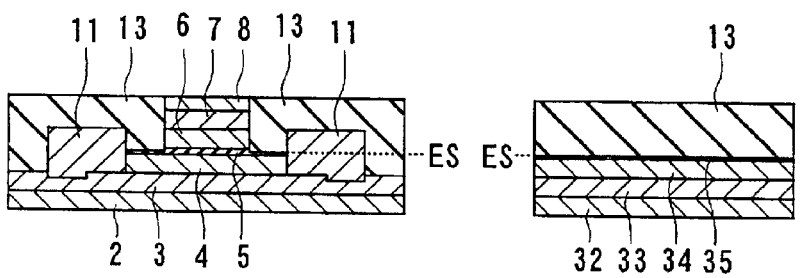
FIG. 11A     FIG. 11B

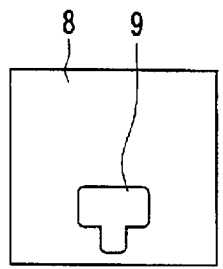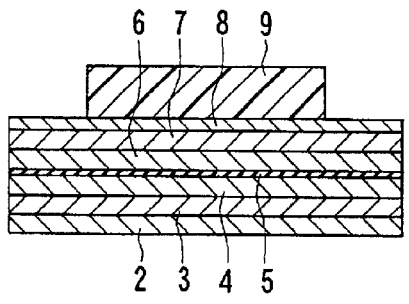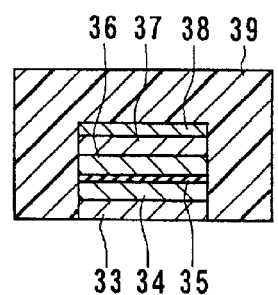
FIG. 15A    FIG. 15B    FIG. 15C
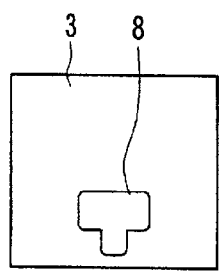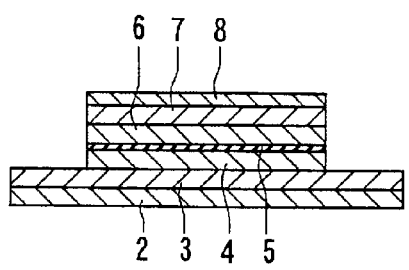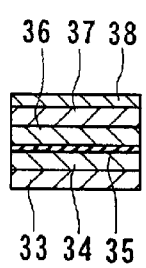
FIG. 16A    FIG. 16B    FIG. 16C
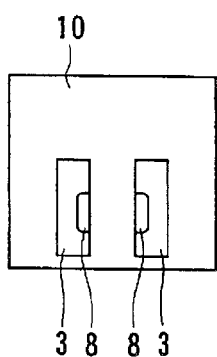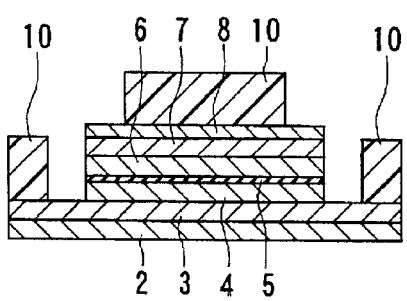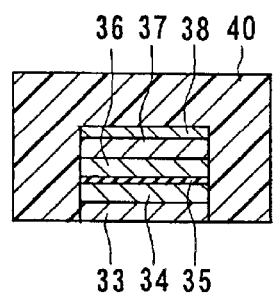
FIG. 17A    FIG. 17B    FIG. 17C

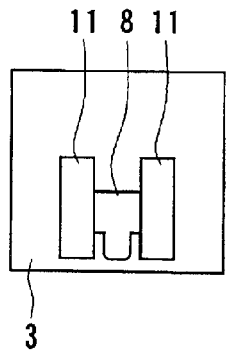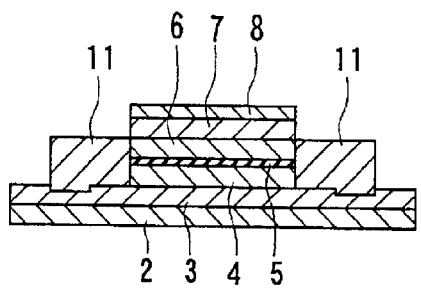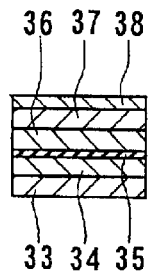
FIG. 18A　　FIG. 18B　　FIG. 18C
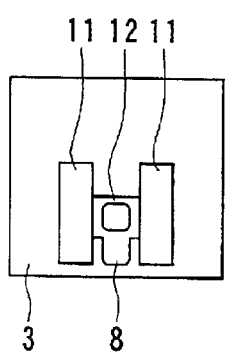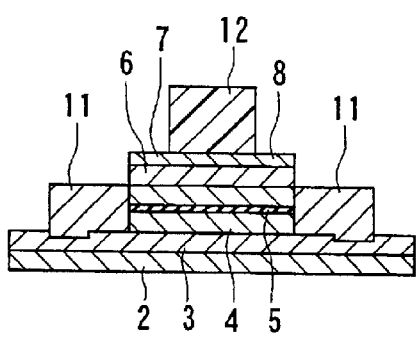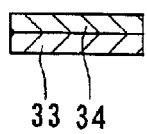
FIG. 19A　　FIG. 19B　　FIG. 19C
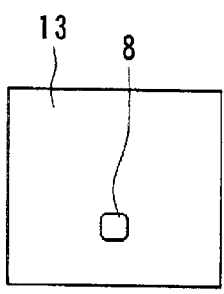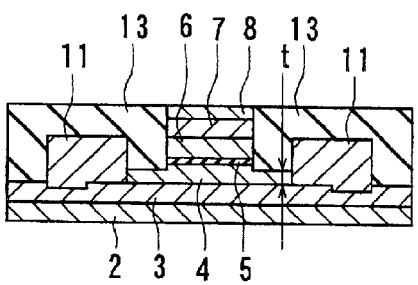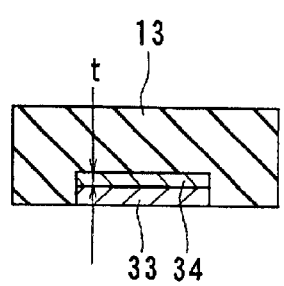
FIG. 20A　　FIG. 20B　　FIG. 20C

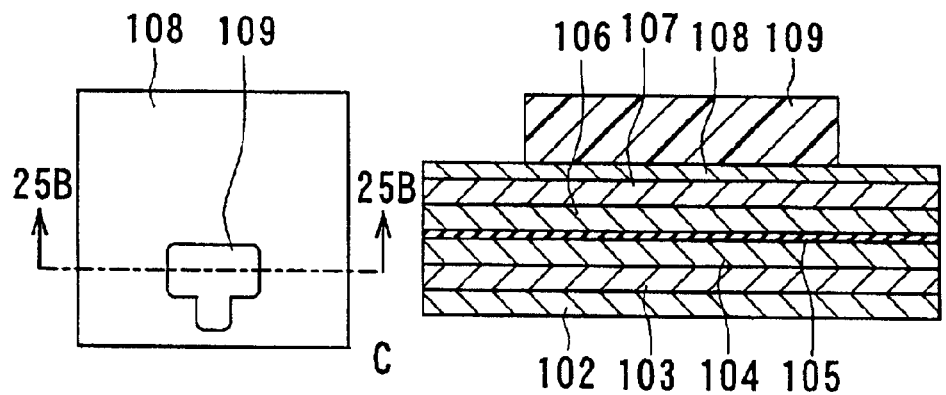
FIG. 25A
RELATED ART
FIG. 25B
RELATED ART
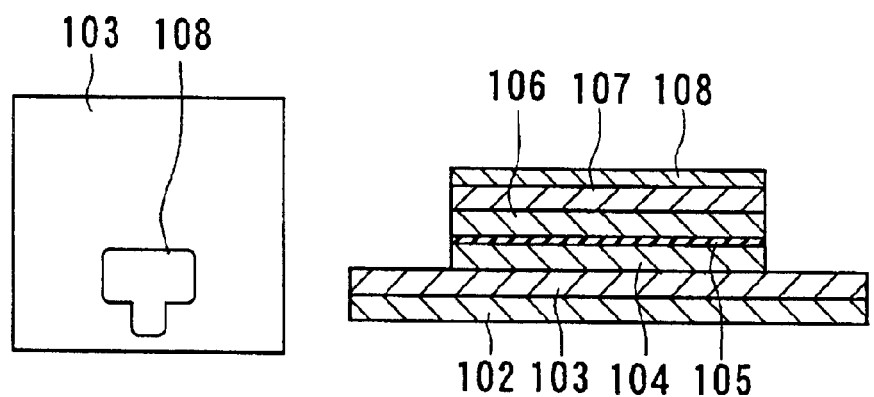
FIG. 26A
RELATED ART
FIG. 26B
RELATED ART

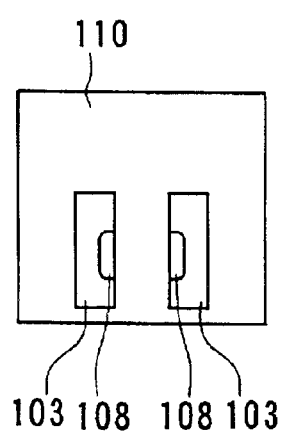 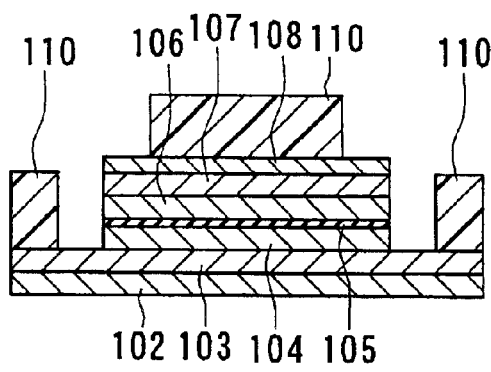
FIG. 27A
RELATED ART
FIG. 27B
RELATED ART
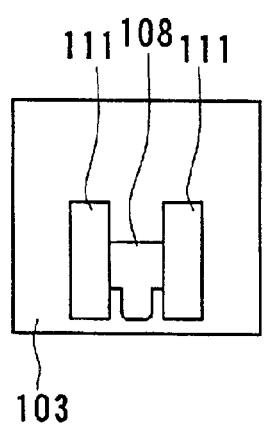 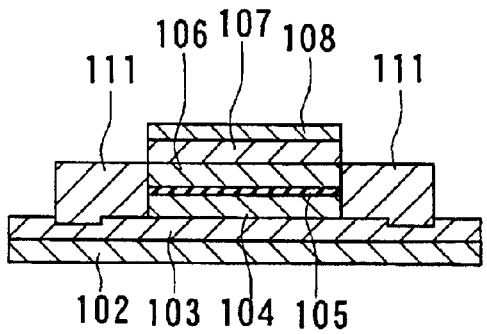
FIG. 28A
RELATED ART
FIG. 28B
RELATED ART

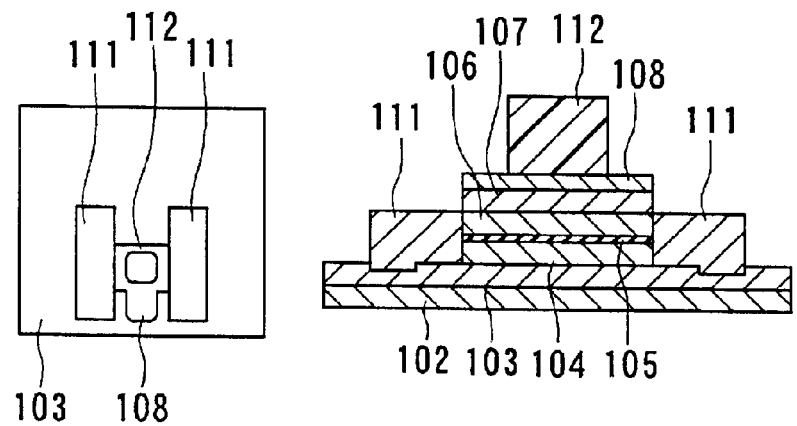
FIG. 29A
RELATED ART
FIG. 29B
RELATED ART
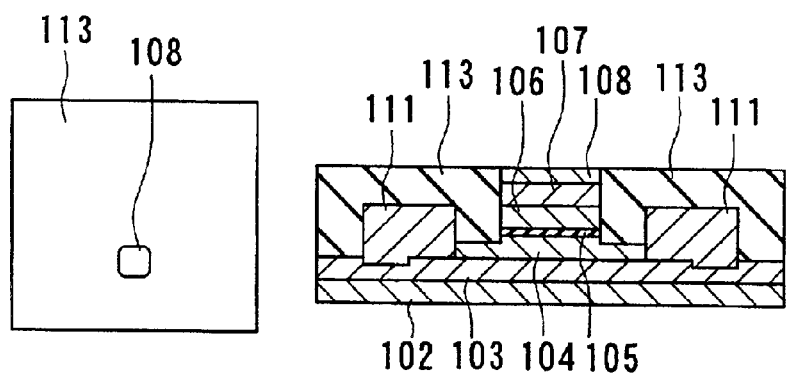
FIG. 30A
RELATED ART
FIG. 30B
RELATED ART

THIN-FILM MAGNETIC HEAD AND METHOD OF MANUFACTURING SAME, AND METHOD OF FORMING A PATTERNED THIN FILM FOR A THIN-FILM MAGNETIC HEAD

BACKGROUND OF THE INVENTION

1. Field of the Invention

The present invention relates to a thin-film magnetic head that utilizes the magnetoresistive element for reading the magnetic field intensity of a magnetic recording medium, for example, as a signal, and a method of manufacturing such a thin-film magnetic head. The invention also relates to a method of forming a patterned thin film for a thin-film magnetic head that comprises a base body and a thin-film magnetic head element formed on the base body.

2. Description of the Related Art

Increase in recording density has been demanded of magnetic disk drives along with a demand for higher capacity and smaller sizes. Further, performance improvements in thin-film magnetic heads have been demanded. Thin-film magnetic heads in widespread use include composite thin-film magnetic heads. A composite thin-film magnetic head is made of a layered structure including a write (recording) head having an induction-type electromagnetic transducer for writing and a read (reproducing) head having a magnetoresistive (MR) element for reading that detects a magnetic field through the use of the magnetoresistive effect.

Read heads that exhibit high sensitivity and produce high outputs have been required. In response to such demands, attention has been focused on tunnel magnetoresistive elements (that may be hereinafter called TMR elements) that detect a magnetic field through the use of the tunnel magnetoresistive effect.

A TMR element normally has a structure in which a lower magnetic layer, a tunnel barrier layer and an upper magnetic layer are stacked. Each of the lower magnetic layer and the upper magnetic layer includes a ferromagnetic substance. In general, the magnetic layer closer to the substrate is called the lower magnetic layer and the magnetic layer farther from the substrate is called the upper magnetic layer. Therefore, the terms 'upper' and 'lower' of the upper and lower magnetic layers do not always correspond to the position in the arrangement of an actual TMR element.

The tunnel barrier layer is a layer made of a thin non-magnetic insulating film through which electrons are capable of passing while maintaining spins thereof by means of the tunnel effect, that is, through which a tunnel current is allowed to pass. The tunnel magnetoresistive effect is a phenomenon in which, when a current is fed to a pair of magnetic layers sandwiching the tunnel barrier layer, a tunnel current passing through the tunnel barrier layer changes, depending on the relative angle between magnetizations of the two magnetic layers. If the relative angle between magnetizations of the magnetic layers is small, the tunneling rate is high. As a result, the resistance to the current passing across the magnetic layers is reduced. If the relative angle between magnetizations of the magnetic layers is large, the tunneling rate is low. The resistance to the current passing across the magnetic layers is therefore increased.

With regard to the structure of a thin-film magnetic head incorporating a TMR element, if the tunnel barrier layer made up of a thin insulating layer is exposed in the medium facing surface that faces a recording medium, a short circuit may occur between the two magnetic layers opposed to each other with the tunnel barrier layer in between, during or after lapping of the medium facing surface. Such a structure is therefore not preferred.

To respond to such a problem, U.S. patent application Ser. No. 09/517,580, for instance, proposes a thin-film magnetic head having a structure in which a part where the lower magnetic layer, the tunnel barrier layer and the upper magnetic layer overlap (hereinafter called the tunnel joint) retreats from the medium facing surface, and a soft magnetic layer is provided for introducing a signal magnetic flux to the tunnel joint. The soft magnetic layer extends from the medium facing surface to the point in which the tunnel joint is located. In the present application this soft magnetic layer is called a front flux guide (FFG) and the thin-film magnetic head having the above-described structure is called an FFG-type TMR head. FFG may also serve as the lower or upper magnetic layer. In the FFG-type TMR head, when the medium facing surface is lapped to control the distance between the medium facing surface and the TMR element, the TMR element will never be lapped. Therefore, the FFG-type TMR head has a feature that the medium facing surface of the head is defined by mechanical lapping without creating a short circuit between the two magnetic layers.

Reference is now made to FIG. 25A to FIG. 31A and FIG. 25B to FIG. 31B to describe an example of a method of manufacturing the FFG-type TMR head. FIG. 25A to FIG. 31A and FIG. 25B to FIG. 31B illustrate the steps of the method. FIG. 25A to FIG. 31A show the integrated surfaces (on top face), whereas FIG. 25B to FIG. 31B show the cross sections on the position that corresponds to line 25B—25B in FIG. 25A.

In this method, as shown in FIG. 25A and FIG. 25B, a lower electrode layer 102, a lower metallic layer 103, a lower ferromagnetic layer 104, a tunnel barrier layer 105, an upper ferromagnetic layer 106, a pinning layer 107 and a capping layer 108 are stacked one by one on a substrate that is not illustrated. Here, the pinning layer 107 is provided for fixing the magnetizing direction of the upper ferromagnetic layer 106 in the direction in which the magnetic field is detected. The capping layer 108 is provided for preventing deterioration of properties and oxidization of the surface of the pinning layer 107. A multi-layer film including the lower ferromagnetic layer 104, the tunnel barrier layer 105 and the upper ferromagnetic layer 106 is hereinafter called a TMR multi-layer film.

Next, a resist mask 109 used for patterning the TMR multi-layer film is formed by photolithography on the capping layer 108. After that, the capping layer 108, the pinning layer 107, the upper ferromagnetic layer 106, the tunnel barrier layer 105 and the lower ferromagnetic layer 104 are selectively etched through ion milling, for example, using the resist mask 109 to pattern the TMR multi-layer film as shown in FIG. 26A and FIG. 26B. The resist mask 109 is then removed.

Next, as shown in FIG. 27A and FIG. 27B, resist masks 110 are formed by photolithography on the lower metallic layer 103 and the capping layer 108, to cover regions except where hard magnetic layers are to be formed. Subsequently, the capping layer 108, the pinning layer 107, the upper ferromagnetic layer 106, the tunnel barrier layer 105 and the lower ferromagnetic layer 104 are selectively etched by ion milling, for example, using the resist masks 110.

Next, as shown in FIG. 28A and FIG. 28B, hard magnetic layers 111 are formed on regions of the lower metallic layer 103 that are not covered with the resist masks 110. The hard magnetic layers 111 are for applying a bias magnetic field to the tunnel joint. The resist masks 110 are then lifted off.

Next, as shown in FIG. 29A and FIG. 29B, a resist mask 112 is formed on the capping layer 108 by photolithography. This resist mask is for defining the shape of the tunnel joint.

Next, as shown in FIG. 30A and FIG. 30B, at least the capping layer 108, the pinning layer 107 and the upper ferromagnetic layer 106 are selectively etched using the resist mask 112, for example through ion milling, to define the shape of the tunnel joint. Here, a position at which the etching is to be stopped is set at a predetermined position between the top surface of the tunnel barrier layer 105 and a position located partway through the lower ferromagnetic layer 104 in its thickness direction. Next, an insulation layer 113 is formed over the surface and the resist mask 112 is then lifted off.

Next, as shown in FIG. 31A and FIG. 31B, an upper electrode layer 114 is formed on the capping layer 108 and on the insulation layer 113. Thus, a TMR element component and its periphery in an FFG-type TMR head are formed. In this FFG-type TMR head, the lower ferromagnetic layer 104 is T-shaped with a portion extending from the tunnel joint towards the medium facing surface (or lower in FIG. 25A to FIG. 31A) and two other portions extending from the tunnel joint towards both sides in a direction parallel to the medium facing surface. This lower ferromagnetic layer 104 serves as FFG.

In general, on a single wafer (substrate), a large number of parts that will be heads (hereinafter called head parts) are formed and, an aggregate of the head parts is cut into individual heads. In the process of cutting the aggregate of head parts into final heads, the medium facing surface of each head is defined by lapping. Through this lapping process, the lower ferromagnetic layer 104, serving as FFG, is exposed in the medium facing surface and the distance between the medium facing surface and the tunnel joint is controlled.

A flying-type thin-film magnetic head for magnetic disk drives is in general in the shape of a slider with a thin-film magnetic head element formed at its rear end. Here, the thin-film magnetic head element refers to the part incorporating an MR element or an induction-type electromagnetic transducer and electromagnetically functioning as a magnetic head. A slider has rails on the side of the medium facing surface and is designed to slightly fly over a recording medium by means of an airflow generated by the rotation of the medium. A medium facing surface of a flying-type thin-film magnetic head is also called an air bearing surface.

In the process of manufacturing an FFG-type TMR head as described above, when at least the capping layer 108, the pinning layer 107 and the upper ferromagnetic layer 106 are selectively etched to define the shape of the tunnel joint as shown in FIG. 30A and FIG. 30B, it is necessary to achieve a highly precise control of a position at which etching is to be stopped, so as to suppress variations in properties of heads.

For performing etching by ion milling up to a specific layer in the multi-layer film or to a predetermined position located partway through a specific layer in the multi-layer film, the position at which the etching is to be stopped can be controlled by performing a measurement for identifying scattered elements arising from the ion milling, using Secondary Ion Mass Spectrometry (SIMS), for example. In this case, the measurement for identifying the scattered elements is performed concurrently with ion milling. The material of a film being etched and the depth of the etching in the film are judged from the measurement results on a real-time basis, to thereby control the position at which the etching is to be stopped.

Published Unexamined Japanese Patent Application KOKAI) Heisei 11-274600 (1999) discloses a method of controlling a position at which etching is to be stopped, by detecting the intensity of the light from the elements in a layer being etched during ion milling to judge the material of the layer and the depth of the etching in the layer on a real-time basis.

However, in the method of manufacturing the FFG-type TMR head as shown in FIG. 25A to FIG. 31A and FIG. 25B to FIG. 31B, the finely-patterned TMR multi-layer film is etched using the resist mask 112, as shown in FIG. 29A to FIG. 29B, when the shape of the tunnel joint is defined. This makes the region etched for defining the shape of the tunnel joint extremely small in area. It means that there is a limited amount of scattered substances involved in the process of the etching for defining the shape of the tunnel joint, so that it is difficult to make a precise measurement for identifying the scattered elements as mentioned above. Consequently, it is difficult to accurately control a position at which the etching is to be stopped.

A possible solution to the foregoing problem is making a dummy region on an integrated surface of a wafer separately from the head parts, to use the dummy region for measurement for identifying elements scattered during etching. From the viewpoint of efficiency in manufacturing heads, however, it is preferable to increase the number of heads obtainable from one wafer. To achieve this, it is necessary to increase the density of head parts on a wafer. Hence, it is unfavorable in the respect of efficiency in manufacturing heads to make a dummy region separately from the head parts on the integrated surface of a wafer, as it leads to a lower density of the head parts on the wafer.

Another conceivable remedy is to use a dummy wafer prepared with films of the same composition as that of the films for forming the head, separate from the wafer having the actual films for forming the head thereon. The dummy wafer is used to perform measurements by SIMS, for example, to learn the relationship between the duration of etching for defining the shape of the tunnel joint and the type of scattered elements and their amount, beforehand. Then, based on the relationship, a required duration of the etching for defining the shape of the tunnel joint is calculated. However, this method lowers the efficiency of head production, as it requires calculation of the relationship between the duration of etching and the type and the amount of scattered substances every time the composition of the films for forming the head is changed. Moreover, due to variations in the status of films between wafers, the position at which the etching is to be stopped cannot always be accurately controlled for each wafer, because this method controls the duration of the etching on the actual films for forming the head based on the measurement results obtained through etching the films on the dummy wafer. Accordingly, this method cannot sufficiently suppress variations in properties of heads.

OBJECT AND SUMMARY OF THE INVENTION

It is an object of the invention to provide a thin-film magnetic head and a method of manufacturing same, and a method of forming a patterned thin-film for a thin-film magnetic head, which make it possible to suppress variations in properties of heads arising from variations in positions at which etching is stopped, without lowering the production efficiency.

A method of manufacturing a thin-film magnetic head of the invention is provided for manufacturing a thin-film magnetic head having a magnetoresistive element, the method comprising the steps of:

forming a film for the magnetoresistive element, which is used for forming the magnetoresistive element, and a dummy film having a composition the same as that of the film for the magnetoresistive element and not used for forming the magnetoresistive element, into predetermined shapes respectively, on a base on which the magnetoresistive element is to be formed, within a region in which one thin-film magnetic head is to be formed;

in order to form the magnetoresistive element by etching a part of the film for the magnetoresistive element, etching a part of the film for the magnetoresistive element in its thickness direction in a specific region within the film, and a part of the dummy film in its thickness direction at the same time; and controlling a position at which the etching is to be stopped, by performing, in the step of etching, a measurement for identifying elements scattered from the film for the magnetoresistive element and from the dummy film due to the etching, so as to perform the control based on results thereof.

According to the method of manufacturing a thin-film magnetic head of the invention, the film for the magnetoresistive element and the dummy film are etched at the same time in the step of the etching. Further, in the step of controlling a position at which the etching is to be stopped, a measurement is performed for identifying elements that are scattered from the film for the magnetoresistive element and from the dummy film due to the etching. Therefore, the invention allows to perform the measurement with high precision and consequently makes it possible to control a position at which the etching is to be stopped with high precision.

In the method of manufacturing a thin-film magnetic head of the invention, each of the film for the magnetoresistive element and the dummy film may include a first magnetic layer, a tunnel barrier layer and a second magnetic layer that are stacked in this order on the base. In this case, the position at which the etching is to be stopped may be any of: a boundary between the second magnetic layer and the tunnel barrier layer; a position located partway through the tunnel barrier layer in its thickness direction; a boundary between the tunnel barrier layer and the first magnetic layer; and a position located partway through the first magnetic layer in its thickness direction.

The method of manufacturing a thin-film magnetic head of the invention may further comprise the step of forming a metallic layer that serves as the base on which the film for the magnetoresistive element and the dummy film are formed. In this case, the metallic layer may be formed of a non-magnetic metal.

In the method of manufacturing a thin-film magnetic head of the invention, the dummy film may be formed at a position where it is hidden from an integrated surface by a patterned thin film formed after the dummy film has been formed.

In the method of manufacturing a thin-film magnetic head of the invention, the dummy film may have a shape that represents a symbol for identifying each individual thin-film magnetic head.

In the method of manufacturing a thin-film magnetic head of the invention, a region in which the dummy film is formed may have an area that falls within a range of 0.05 to 30 percent of the area of the region in which one thin-film magnetic head is to be formed.

In the method of manufacturing a thin-film magnetic head of the invention, a region in which the dummy film is formed may have an area that falls within a range of 0.1 to 20 percent of the area of the region in which one thin-film magnetic head is to be formed.

A thin-film magnetic head of the invention has a magnetoresistive element and a dummy component that are formed on a base. The magnetoresistive element is formed by etching a part of a film for the magnetoresistive element, the film having a specific shape and being used for forming the magnetoresistive element, in its thickness direction in a specific region within the film. The dummy component is formed by etching a part of a dummy film in its thickness direction, the dummy film having a composition the same as that of the film for the magnetoresistive element and not being used for forming the magnetoresistive element.

The thin-film magnetic head of the invention has the dummy component formed by etching a part of the dummy film in its thickness direction. When forming the magnetoresistive element by etching a part of the film for the magnetoresistive element so as to manufacture the thin-film magnetic head of the invention, it is possible to etch the film for the magnetoresistive element and the dummy film at the same time. Therefore, according to the invention, it is possible to perform the measurement for identifying elements scattered from the film for the magnetoresistive element and from the dummy film due to the etching with high precision, and thereby to control, with high precision, a position at which the etching is to be stopped.

In the thin-film magnetic head of the invention, the magnetoresistive element may include a first magnetic layer, a tunnel barrier layer and a second magnetic layer that are stacked in this order on the base. In this case, one of surfaces of the dummy component farther from the base may be located at: a position corresponding to a boundary between the second magnetic layer and the tunnel layer of the magnetoresistive element in a direction of thickness of the magnetoresistive element; a position corresponding to a position located partway through the tunnel barrier layer of the magnetoresistive element in a direction of thickness of the magnetoresistive element; a position corresponding to a boundary between the tunnel barrier layer and the first magnetic layer of the magnetoresistive element in a direction of thickness of the magnetoresistive element; or a position corresponding to a position located partway through the first magnetic layer of the magnetoresistive element in a direction of thickness of the magnetoresistive element.

The thin-film magnetic head of the invention may further have a metallic layer that serves as the base on which the magnetoresistive element and the dummy component are formed. In this case, the metallic layer may be formed of a non-magnetic metal.

In the thin-film magnetic head of the invention, the dummy component may be formed at a position where it is hidden from an integrated surface by a patterned thin film formed after the dummy component has been formed.

In the thin-film magnetic head of the invention, the dummy component may have a shape that represents a symbol for identifying each individual thin-film magnetic head.

In the thin-film magnetic head of the invention, a region in which the dummy component is provided may have an area that falls within a range of 0.05 to 30 percent of the area of a surface of the thin-film magnetic head on which the magnetoresistive element and the dummy component are provided.

In the thin-film magnetic head of the invention, a region in which the dummy component is provided may have an area that falls within a range of 0.1 to 20 percent of the area of a surface of the thin-film magnetic head on which the magnetoresistive element and the dummy component are provided.

A method of forming a patterned thin film according to the invention is provided for forming a patterned thin film for a thin-film magnetic head that includes a base body and a thin-film magnetic head element formed on the base body. The patterned thin film is included in the thin-film magnetic head element. The thin-film magnetic head element is formed by etching a part of a film to be etched having a specific shape, in a direction of thickness of the film to be etched in a specific region within the film to be etched. The method of the invention includes the steps of:

forming the film to be etched and a dummy film that has a composition the same as that of the film to be etched and is not used for forming the patterned thin film, into predetermined shapes respectively, on a base on which the patterned thin film is to be formed, within a region in which one thin-film magnetic head is to be formed;

in order to form the patterned thin film by etching a part of the film to be etched, etching a part of the film to be etched in its thickness direction in a specific region within the film, and a part of the dummy film in its thickness direction at the same time; and controlling a position at which the etching is to be stopped, by performing, in the step of etching, a measurement for identifying elements scattered from the film to be etched and from the dummy film due to the etching, so as to perform the control based on results thereof.

According to the method of forming a patterned thin film of the invention, the film to be etched and the dummy film are etched at the same time in the step of etching. Further, in the step of controlling a position at which the etching is to be stopped, a measurement is performed for identifying elements that are scattered from the film to be etched and from the dummy film due to the etching. Therefore, the invention allows to perform the measurement with high precision and consequently makes it possible to control a position at which the etching is to be stopped with high precision.

Other and further objects, features and advantages of the invention will appear more fully from the following description.

BRIEF DESCRIPTION OF THE DRAWINGS

FIG. 3A to FIG. 3C illustrate a step in a method of manufacturing the thin-film magnetic head of the first embodiment of the invention.

FIG. 4A to FIG. 4C illustrate a step that follows FIG. 3A to FIG. 3C.

FIG. 5A to FIG. 5C illustrate a step that follows FIG. 4A to FIG. 4C.

FIG. 6A to FIG. 6C illustrate a step that follows FIG. 5A to FIG. 5C.

FIG. 7A to FIG. 7C illustrate a step that follows FIG. 6A to FIG. 6C.

FIG. 8A to FIG. 8C illustrate a step that follows FIG. 7A to FIG. 7C.

FIG. 9A to FIG. 9C illustrate a step that follows FIG. 8A to FIG. 8C.

FIG. 10A and FIG. 10B illustrate another example of a position at which etching for defining a shape of the tunnel joint is to be stopped in the first embodiment of the invention.

FIG. 11A and FIG. 11B illustrate still another example of a position at which etching for defining a shape of the tunnel joint is to be stopped in the first embodiment of the invention.

FIG. 15A to FIG. 15C illustrate a step that follows FIG. 14A to FIG. 14C.

FIG. 16A to FIG. 16C illustrate a step that follows FIG. 15A to FIG. 15C.

FIG. 17A to FIG. 17C illustrate a step that follows FIG. 16A to FIG. 16C.

FIG. 18A to FIG. 18C illustrate a step that follows FIG. 17A to FIG. 17C.

FIG. 19A to FIG. 19C illustrate a step that follows FIG. 18A to FIG. 18C.

FIG. 20A to FIG. 20C illustrate a step that follows FIG. 19A to FIG. 19C.

FIG. 25A and FIG. 25B illustrate a step in an example of a method of manufacturing an FFG-type TMR head.

FIG. 26A and FIG. 26B illustrate a step that follows FIG. 25A and FIG. 25B.

FIG. 27A and FIG. 27B illustrate a step that follows FIG. 26A and FIG. 26B.

FIG. 28A and FIG. 28B illustrate a step that follows FIG. 27A and FIG. 27B.

FIG. 29A and FIG. 29B illustrate a step that follows FIG. 28A and FIG. 28B.

FIG. 30A and FIG. 30B illustrate a step that follows FIG. 29A and FIG. 29B.

DETAILED DESCRIPTION OF THE PREFERRED EMBODIMENTS

Preferred embodiments of the invention will now be described in detail with reference to the accompanying drawings.

[First Embodiment]

Figure 1:
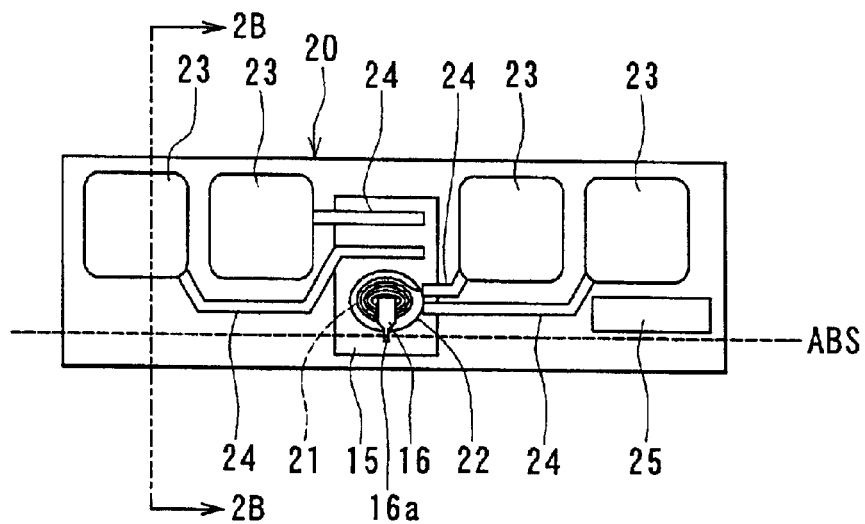
FIG. 1 is a top view that illustrates a thin-film magnetic head of a first embodiment of the invention.
Figures 2A, 2B:
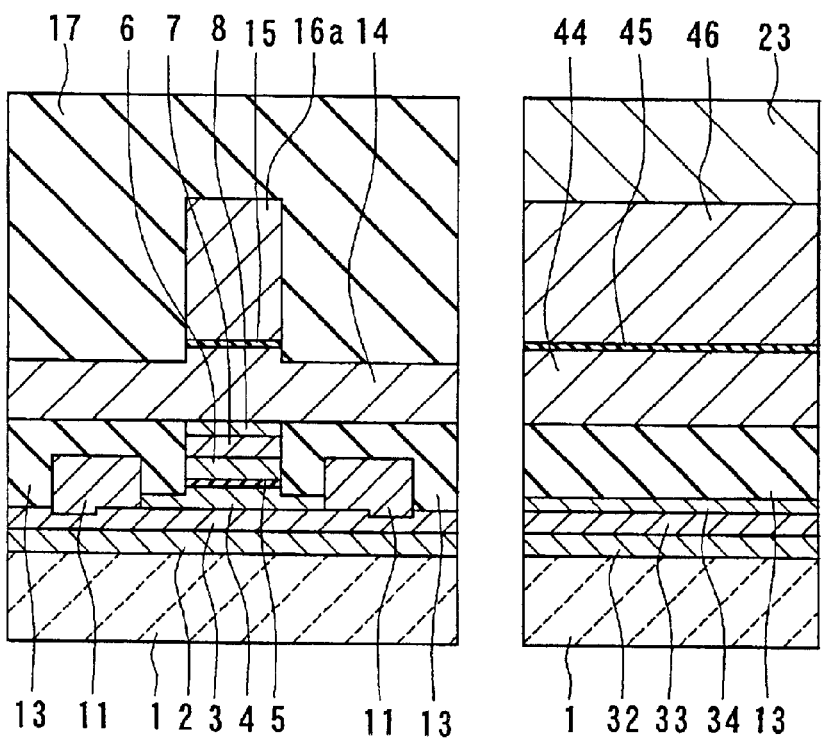
FIG. 2A and FIG. 2B are cross-sectional views that illustrate the thin-film magnetic head of the first embodiment of the invention.

A configuration of a thin-film magnetic head of a first embodiment of the invention will now be described with reference to FIG. 1, FIG. 2A and FIG. 2B. FIG. 1 is a top view that illustrates the thin-film magnetic head of the first embodiment. FIG. 2A and FIG. 2B are cross-sectional views that illustrate the thin-film magnetic head of the embodiment. In FIG. 1, the symbol ABS indicates a position to be an air-bearing surface, that is, a medium facing surface. The medium facing surface is to be formed by lapping. FIG. 2A illustrates a cross section parallel to the medium facing surface, showing a part of a thin-film magnetic head element near the medium facing surface. FIG. 2B is a cross section taken along line 2B—2B in FIG. 1.

The thin-film magnetic head of the embodiment incorporates a substrate 1, a read head formed on the substrate 1, and a write head formed on the read head. The substrate 1 corresponds to the base body of the invention. The read head incorporates a TMR element while the write head incorporates an induction-type electromagnetic transducer.

The read head includes a lower electrode layer 2, a lower metallic layer 3, a lower ferromagnetic layer 4, a tunnel barrier layer 5, an upper ferromagnetic layer 6, a pinning layer 7, a capping layer 8 and an upper electrode layer 14 formed one by one on the substrate 1. The lower ferromagnetic layer 4 is formed into a specific outer shape, to be described in detail later, so as to function as a front flux guide (FFG). A part of the lower ferromagnetic layer 4 located closer to the tunnel barrier layer 5, the tunnel barrier layer 5, the upper ferromagnetic layer 6, the pinning layer 7 and the capping layer 8 are shaped smaller than the outer shape of the lower ferromagnetic layer 4 through etching.

The read head further includes: two hard magnetic layers 11 formed on the lower metallic layer 3 on both sides of the lower ferromagnetic layer 4 in a direction parallel to the medium facing surface; and an insulating layer 13 provided between the lower metallic layer 3 and the upper electrode layer 14, to surround the tunnel barrier layer 5, the upper ferromagnetic layer 6, the pinning layer 7 and the capping layer 8.

The lower electrode layer 2 and the upper electrode layer 14 are provided for feeding an electric current for signal detection to the TMR element. The lower electrode layer 2 also serves as a lower shield layer to shield the TMR element. The upper electrode layer 14 also serves as an upper shield layer to shield the TMR element and as a lower magnetic pole layer of the write head.

The lower metallic layer 3 is provided for adjusting the distance between the lower electrode layer 2 and the upper electrode layer 14. The lower metallic later 3 is made of a non-magnetic metal such as Ta, Cr, NiCr, Ti and TiW.

The lower ferromagnetic layer 4 and the upper ferromagnetic layer 6 are each made of a material such as Fe, Co, Ni, FeCo, NiFe, CoZrNb and FeCoNi. The tunnel barrier layer 5 is made of a non-magnetic insulating material such as $Al_2O_3$, NiO, GdO, MgO, $Ta_2O_5$, $MoO_2$, $TiO_2$, and $WO_2$. However, these materials do not need to be in agreement with stoichiometric composition.

The pinning layer 7 is provided for fixing (pinning) the direction of magnetization of the upper ferromagnetic layer 6 in the direction of magnetic field detection. The pinning layer 7 may be made of any material that can fix the direction of magnetization of the upper ferromagnetic layer 6, but an antiferromagnetic material such as PtMn is generally used.

The capping layer 8 is provided for preventing the pinning layer 7 from experiencing deterioration in its properties or from being oxidized. The capping layer 8 is made of a non-magnetic metal such as Ta, Cr, NiCr, Ti and TiW.

In the present embodiment, a multi-layer film composed of the lower ferromagnetic layer 4, the tunnel barrier layer 5, the upper ferromagnetic layer 6, the pinning layer 7 and the capping layer 8 is called a TMR multi-layer film. The TMR multi-layer film corresponds to the film for the magnetoresistive element or the film to be etched of the invention. A part where the lower ferromagnetic layer 4, the tunnel barrier layer 5 and the upper barrier layer 6 overlap is hereinafter called a tunnel joint. The lower ferromagnetic layer 4, the tunnel barrier layer 5, the upper ferromagnetic layer 6 and the pinning layer 7 make up the TMR element. The lower ferromagnetic layer 4 corresponds to the first magnetic layer of the invention, and the upper ferromagnetic layer 6 corresponds to the second magnetic layer of the invention. Hard magnetic layers 11 are provided for applying a bias magnetic field to the tunnel joint and are formed of a hard magnetic material.

The write head comprises: the lower magnetic pole layer (upper electrode layer 14) and an upper magnetic pole layer 16 magnetically coupled to each other and including magnetic pole portions that are opposed to each other on a side of the medium facing surface, each of the lower and upper magnetic pole layers including at least one layer; a write gap layer 15 made of an insulating film provided between the lower magnetic pole layer (upper electrode layer 14) and the upper magnetic pole layer 16; a thin-film coil 21 at least a part of which is placed between the lower magnetic pole layer (upper electrode layer 14) and the upper magnetic pole layer 16 and above the write gap layer 15; and an insulating film 22 that insulates between the thin-film coil 21 and the upper magnetic pole layer 16. The write gap layer 15 is formed on the lower magnetic pole layer (upper electrode layer 14). The thin-film coil 21 is formed above the write gap layer 15 with the insulating film 22 in between. The upper magnetic pole layer 16 is formed on the insulating film 22 that covers the thin-film coil 21 and on the write gap layer 15. In FIG. 1 and FIG. 2A, numeral 16a indicates the magnetic pole portion of the upper magnetic pole layer 16. The write gap layer 15 has a contact hole formed in the center portion of the thin-film coil 21. The upper magnetic pole layer 16 is magnetically coupled to the lower magnetic pole layer (upper electrode layer 14) through the contact hole.

The thin-film magnetic head further has a protection layer 17 made of an insulating material such as alumina ($Al_2O_3$) to cover the entire write head. The thin-film magnetic head further has: four terminals (bonding pads) 23 exposed on top; conductors 24 for electrically connecting the lower electrode layer 2, the upper electrode layer 14 and both ends of the thin-film coil 21 with the terminals 23; and an identification section 25 for identifying each individual thin-film magnetic head. The terminals 23 and the conductors 24 are each made of a metallic film. The conductors 24 are formed within the protection layer 17. The identification section 25 has a patterned thin film formed therein. The patterned thin film represents an identification symbol for identifying individual thin-film magnetic heads.

As shown in FIG. 2B, in a region where any one of the terminals 23 is provided, there are formed a dummy lower electrode layer 32, a dummy lower metallic layer 33, a dummy lower ferromagnetic layer 34, the insulating layer 13, a dummy upper electrode layer 44, a dummy write gap layer 45, a dummy upper magnetic pole layer 46, and the terminal 23 on the substrate 1 in that order. The dummy lower electrode layer 32 is made of the same material as that of the lower electrode layer 2. The dummy lower metallic layer 33 is made of the same material as that of the metallic layer 3. The dummy lower ferromagnetic layer 34 is made of the same material as that of the lower ferromagnetic layer 4. The dummy upper electrode layer 44 is made of the same material as that of the upper electrode layer 14. The dummy write gap layer 45 is made of the same material as that of the write gap layer 15. The dummy upper magnetic pole layer 46 is made of the same material as that of the upper magnetic pole layer 16.

The dummy lower ferromagnetic layer 34 located in the region where the terminal 23 is provided constitutes the dummy component of the embodiment of the invention. As described in detail later, the dummy lower ferromagnetic layer 34 is formed by etching a part of a dummy film in its thickness direction. The dummy film is identical to the TMR multi-layer film in composition but it is not used for forming the TMR element. In the present embodiment, a region where the dummy component is formed is called a dummy region.

A method of manufacturing the thin-film magnetic head of the embodiment is now summarized. In this method, the read head is initially formed on the substrate 1. Next, the write head is formed on the read head, and the conductors 24, the terminals 23 and the protection layer 17 are formed. Parts that are to be a large number of thin-film magnetic heads (hereinafter called head parts) are formed on each wafer (substrate 1). An aggregate of such head parts is cut into individual thin-film magnetic heads. During the process to form a final thin-film magnetic head through cutting the aggregate of the head parts, the medium facing surface of the thin-film magnetic head is defined by lapping. Through this lapping, the lower ferromagnetic layer 4 serving as FFG and the magnetic pole portion of the write head are exposed in the medium facing surface, and throat height and the distance from the medium facing surface to the tunnel joint are controlled. Throat height is the length (height) of the magnetic pole portion measured between its medium-facing-surface-side end and the other end.

A method of manufacturing the read head of the thin-film magnetic head of the embodiment will now be described in detail with reference to FIG. 3A to FIG. 9A, FIG. 3B to FIG. 9B and FIG. 3C to FIG. 9C. FIG. 3A to FIG. 9A illustrate an integrated surface (top surface). FIG. 3B to FIG. 9B illustrate cross sections at a position corresponding to line 3B—3B in FIG. 3A. FIG. 3C to FIG. 9C illustrate cross sections at a position corresponding to line 2B—2B in FIG. 1.

According to the method of manufacturing the read head of the thin-film magnetic head of the embodiment, as shown in FIG. 3A and FIG. 3B, the lower electrode layer 2, the lower metallic layer 3, the lower ferromagnetic layer 4, the tunnel barrier layer 5, the upper ferromagnetic layer 6, the pinning layer 7 and the capping layer 8 are formed one by one into specific patterns respectively on the substrate (not shown), in a region where a thin-film magnetic head element is to be formed. At the same time, as shown in FIG. 3C, the dummy lower electrode layer 32, the dummy lower metallic layer 33, the dummy lower ferromagnetic layer 34, the dummy tunnel barrier layer 35, the dummy upper ferromagnetic layer 36, the dummy pinning layer 37 and the dummy capping layer 38 are formed one by one into specific patterns respectively on the substrate (not shown) in the dummy region. Those dummy layers are formed using the same materials as those of the lower electrode layer 2, the lower metallic layer 3, the lower ferromagnetic layer 4, the tunnel barrier layer 5, the upper ferromagnetic layer 6, the pinning layer 7 and the capping layer 8 respectively, and under the same conditions as those for forming the respective layers 2 through 8. A multi-layer film including the dummy lower ferromagnetic layer 34 through the dummy capping layer 38 serves as the dummy film. The dummy film is identical to the TMR multi-layer film in composition but it is not used for forming the TMR element.

Next, as shown in FIG. 3A and FIG. 3B, a resist mask 9 for patterning the TMR multi-layer film is formed on the capping layer 8 by photolithography. At the same time, as shown in FIG. 3C, a resist mask 39 is formed over the entire surface of the dummy capping layer 38 by photolithography. Next, the capping layer 8, the pinning layer 7, the upper ferromagnetic layer 6, the tunnel barrier layer 5 and the lower ferromagnetic layer 4 are selectively etched through ion milling, for example, using the resist mask 9, to pattern the TMR multi-layer film as shown in FIG. 4A and FIG. 4B. At this time, however, the dummy capping layer 38, the dummy pinning layer 37, the dummy upper ferromagnetic layer 36, the dummy tunnel barrier layer 35 and the dummy lower ferromagnetic layer 34 are not etched, as shown in FIG. 4C. Then, the resist masks 9 and 39 are removed.

Next, as shown in FIG. 5A and FIG. 5B, a resist mask 10 is formed on the lower metallic layer 3 and the capping layer 8 by photolithography to cover regions excluding where the hard magnetic layers are to be formed. At the same time, as shown in FIG. 5C, a resist mask 40 is formed by photolithography over the entire surface of the dummy capping layer 38.

Next, the capping layer 8, the pinning layer 7, the upper ferromagnetic layer 6, the tunnel barrier layer 5 and the lower ferromagnetic layer 4 are selectively etched through ion milling, for example, using the resist mask 10, so that those layers are patterned as shown in FIG. 6A and FIG. 6B. At this time, however, the dummy capping layer 38, the dummy pinning layer 37, the dummy upper ferromagnetic layer 36, the dummy tunnel barrier layer 35 and the dummy lower ferromagnetic layer 34 are not etched, as shown in FIG. 6C.

Next, as shown in FIG. 6A and FIG. 6B, the hard magnetic layers 11 are formed on regions of the lower metallic layer 3 that are not covered with the resist mask 10. At this time, as shown in FIG. 6C, no hard magnetic layers 11 are formed on the dummy capping layer 38. Then, the resist masks 10 and 40 are lifted off.

Next, as shown in FIG. 7A and FIG. 7B, a resist mask 12 used for defining a shape of the tunnel joint is formed on the capping layer 8 by photolithography. At this time, as shown in FIG. 7C, no resist mask is formed on the dummy capping layer 38.

Next, as shown in FIG. 8A and FIG. 8B, at least the capping layer 8, the pinning layer 7 and the upper ferromagnetic layer 6 are selectively etched through ion milling, for example, using the resist mask 12, to define a shape of the tunnel joint. Here, a position ES at which the etching is to be stopped is set at a specific position between the top surface of the tunnel barrier layer 5 and any position located partway through the lower ferromagnetic layer 4 in its thickness direction. FIG. 8B illustrates an example in which the position ES is located partway through the lower ferromagnetic layer 4 in its thickness direction. In the etching step for defining the shape of the tunnel joint, as shown in FIG. 8C, in the dummy region at least the dummy capping layer 38, the dummy pinning layer 37 and the dummy upper ferromagnetic layer 36 are etched. In the dummy region, the position ES at which the etching is to be stopped is set at a specific position between the top surface of the dummy tunnel barrier layer 35 and any position located partway through the dummy lower ferromagnetic layer 34 in its thickness direction, similarly to the case in the region where the thin-film magnetic head element is to be formed. FIG. 8C illustrates an example in which the position ES for the dummy region is located partway through the dummy lower ferromagnetic layer 34 in its thickness direction.

In the etching step for defining the shape of the tunnel joint, the TMR multi-layer film as the film for the magnetoresistive element and the dummy film are etched at the same time. During the etching, a measurement is performed for identifying elements scattered from the TMR multi-layer film and the dummy film, using Secondary Ion Mass Spectrometry (SIMS), for example, or by measuring the intensity of the light from the etched films. Based on the measurement results, the material of a film being etched and the depth of the etching in the film are judged on a real-time basis, to thereby control the position at which the etching is to be stopped.

Next, as shown in FIG. 8A to FIG. 8C, the insulating layer 13 is formed over the surface, and the resist mask 12 is then lifted off.

Next, as shown in FIG. 9A and FIG. 9B, the upper electrode layer 14 is formed on the capping layer 8 and the insulating layer 13 in the region where the thin-film magnetic head element is to be formed. At the same time, as shown in FIG. 9C, in the dummy region the dummy upper electrode layer 44 is formed on the insulating layer 13 using the same material as that of the upper electrode layer 14 and under the same conditions as those for forming the upper electrode layer 14.

The read head is manufactured through the foregoing process. In the read head, the shape of the lower ferromagnetic layer 4 is defined by the shape of the resist mask 10. The lower ferromagnetic layer 4 is T-shaped with a portion extending from the tunnel joint towards the medium facing surface (or lower in FIG. 3A to FIG. 9A) and two other portions extending from the tunnel joint towards both sides in a direction parallel to the medium facing surface. The lower ferromagnetic layer 4 serves as FFG.

FIG. 10A to FIG. 12A and FIG. 10B to FIG. 12B illustrate other examples of a position at which the etching for defining the shape of the tunnel joint is to be stopped. FIG. 10A to FIG. 12A and FIG. 10B to FIG. 12B show the respective states in which the insulating layer 13 has been formed after the etching for defining the shape of the tunnel joint, as in FIG. 8A to FIG. 8C. FIG. 10A to FIG. 12A illustrate cross sections at a position corresponding to line 3B—3B in FIG. 3A. FIG. 10B to FIG. 12B illustrate cross sections at a position corresponding to line 2B—2B in FIG. 1.

In the example shown in FIG. 10A and FIG. 10B, the position ES at which the etching is to be stopped is set at the boundary between the upper ferromagnetic layer 6 and the tunnel barrier layer 5. In this example, the position ES in the dummy region is the boundary between the dummy upper ferromagnetic layer 36 and the dummy tunnel barrier layer 35. In this case, the dummy component is made up of the dummy lower ferromagnetic layer 34 and the dummy tunnel barrier layer 35. The surface of the dummy component farther from the base is located at a position corresponding to the boundary between the upper ferromagnetic layer 6 and the tunnel barrier layer 5 in the direction of the thickness of the TMR element.

In the example shown in FIG. 11A and FIG. 11B, the position ES is located partway through the tunnel barrier layer 5 in its thickness direction. In the example, the position ES in the dummy region is located partway through the dummy tunnel barrier layer 35 in its thickness direction. In this case, the dummy component is made up of the dummy lower ferromagnetic layer 34 and part of the dummy tunnel barrier layer 35 in its thickness direction. The surface of the dummy component farther from the base is located at a position corresponding to the position located partway through the tunnel barrier layer 5 in a direction of the thickness of the TMR element.

Figures 12A, 12B:
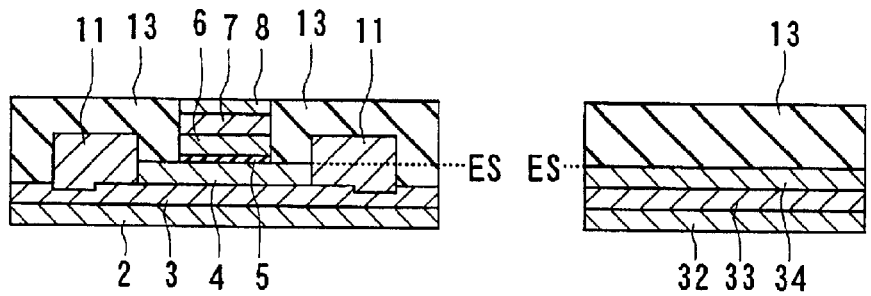
FIG. 12A and FIG. 12B illustrate still another example of a position at which etching for defining a shape of the tunnel joint is to be stopped in the first embodiment of the invention.

In the example shown in FIG. 12A and FIG. 12B, the position ES is set at the boundary between the tunnel barrier layer 5 and the lower ferromagnetic layer 4. In this example, the position ES in the dummy region is the boundary between the dummy tunnel barrier layer 35 and the dummy lower ferromagnetic layer 34. In this case, the dummy component is made up of only the dummy lower ferromagnetic layer 34. The surface of the dummy component farther from the base is located at a position corresponding to the boundary between the tunnel barrier layer 5 and the lower ferromagnetic layer 4 5 in the direction of the thickness of the TMR element.

As explained above, in the present embodiment, when the etching is performed to define the shape of the tunnel joint, the TMR multi-layer film as the film for the magnetoresistive element and the dummy film are etched at the same time. During the etching, a measurement is performed for identifying elements scattered from the TMR multi-layer film and the dummy film, using Secondary Ion Mass Spectrometry (SIMS), for example, or by measuring the intensity of the light from the etched film, so as to control the position at which the etching is to be stopped. According to the embodiment, a larger amount of substances scattered during the etching is available than without the dummy film. Sufficient intensity of signals is therefore available in the measurement for identifying scattered elements, and as a result, a highly precise measurement becomes possible. The present embodiment therefore makes it possible to control the position at which the etching is to be stopped with high precision.

In the embodiment, the dummy region is provided within the region in which one thin-film magnetic head is to be formed. Therefore, according to the embodiment, the dummy region never lowers the density in the region on the wafer where thin-film magnetic heads are to be formed.

Because of the foregoing features of the present embodiment, it is possible to reduce variations in properties of thin-film magnetic heads caused by variations in positions at which etching is stopped, without lowering the production efficiency, or namely, without reducing the number of heads that can be obtained per wafer.

In the process of etching the TMR multi-layer film and the dummy film, a difference in status of their bases from each other may produce a difference in etching conditions, especially in etching rate. In the embodiment, the lower metallic layer 3 that serves as the base of the TMR multi-layer film and the dummy lower metallic layer 33 that serves as the base of the dummy film are provided, so as to allow the TMR multi-layer film and the dummy film to have bases in the same status. This can make the etching conditions for the TMR multi-layer film and those for the dummy film nearly the same.

According to the embodiment, the dummy film or the dummy component is provided at a position where it is hidden from an integrated surface by terminal 23 serving as a patterned thin film formed after the dummy film or the dummy component has been formed. The dummy film or the dummy component is thereby prevented from affecting the exterior appearance of the thin-film magnetic head.

According to the method of manufacturing the thin-film magnetic head of the embodiment, the area of the region where the dummy film is formed preferably falls within a range of 0.05 to 30 percent, or more preferably within a range of 0.1 to 20 percent, of the area of the region where one thin-film magnetic head is to be formed. Similarly, according to the thin-film magnetic head of the embodiment, the area of the region where the dummy film is provided preferably falls within a range of 0.05 to 30 percent, or more preferably within a range of 0.1 to 20 percent, of the area of a surface of the thin-film magnetic head on which the TMR element and the dummy component are provided. The lower limit of the above-mentioned range is the value to be reached to ensure sufficient accuracy of the measurement for identifying elements scattered from the TMR multi-layer film and from the dummy film due to the etching. On the other hand, the upper limit of the above-mentioned range is the maximum ratio of the area of the region of the dummy film or the dummy component that can be provided without affecting the exterior appearance of the thin-film magnetic head. Hence, keeping the ratio of the area of the region of the dummy film or the dummy component within the above-mentioned range makes it possible to sufficiently raise the accuracy of the measurement for identifying elements scattered from the TMR multi-layer film and from the dummy film due to the etching, and to provide the dummy film or the dummy component at a position where it will not affect the exterior appearance of the thin-film magnetic head.

[Second Embodiment]

A method of manufacturing the read head of a thin-film magnetic head of a second embodiment of the invention will now be described with reference to FIG. 13A to FIG. 21A, FIG. 13B to FIG. 21B and FIG. 13C to FIG. 21C. According to the embodiment, the dummy region is provided in the identification section 25. FIG.13A to FIG. 21A illustrate an integrated surface (top surface). FIG. 13B to FIG. 21B illustrate cross sections at a position corresponding to line 3B—3B in FIG. 3A. FIG. 13C to FIG. 21C illustrate cross sections of part of the identification section 25 shown in FIG. 1.

Figures 13A, 13B, 13C:
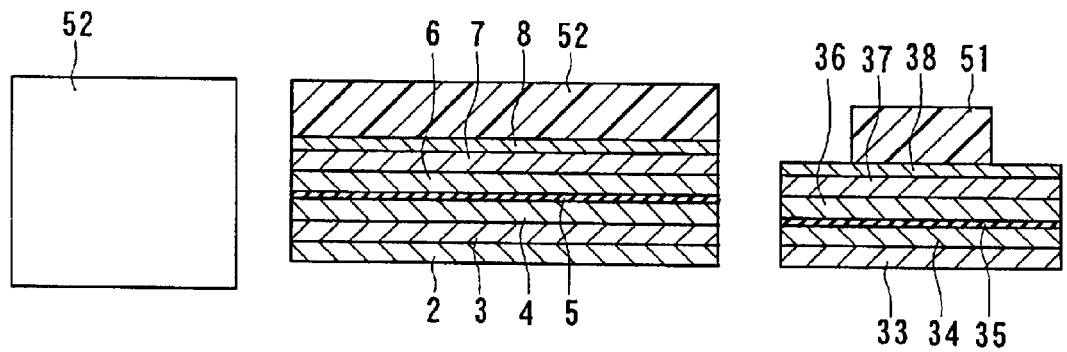
FIG. 13A to FIG. 13C illustrate a step in a method of manufacturing a thin-film magnetic head of a second embodiment of the invention.

According to the method of manufacturing the read head of the thin-film magnetic head of the embodiment, as shown in FIG. 13A and FIG. 13B, the lower electrode layer 2, the lower metallic layer 3, the lower ferromagnetic layer 4, the tunnel barrier layer 5, the upper ferromagnetic layer 6, the pinning layer 7 and the capping layer 8 are formed one by one into specific patterns respectively on the substrate (not shown), in a region where a thin-film magnetic head element is to be formed. At the same time, as shown in FIG. 13C, the dummy lower metallic layer 33, the dummy lower ferromagnetic layer 34, the dummy tunnel barrier layer 35, the dummy upper ferromagnetic layer 36, the dummy pinning layer 37 and the dummy capping layer 38 are formed one by one into specific patterns respectively on the substrate (not shown) in the dummy region, that is, a region to serve as the identification section 25. Those dummy layers are formed using the same materials as those of the lower metallic layer 3, the lower ferromagnetic layer 4, the tunnel barrier layer 5, the upper ferromagnetic layer 6, the pinning layer 7 and the capping layer 8 respectively, and under the same conditions as those for forming the respective layers 3 through 8. A multi-layer film including the dummy lower ferromagnetic layer 34 through the dummy capping layer 38 serves as the dummy film. The dummy film is identical to the TMR multi-layer film made up of the lower ferromagnetic layer 4 through the capping layer 8 in composition, but the dummy film is not used for forming the TMR element.

Figures 14A, 14B, 14C:
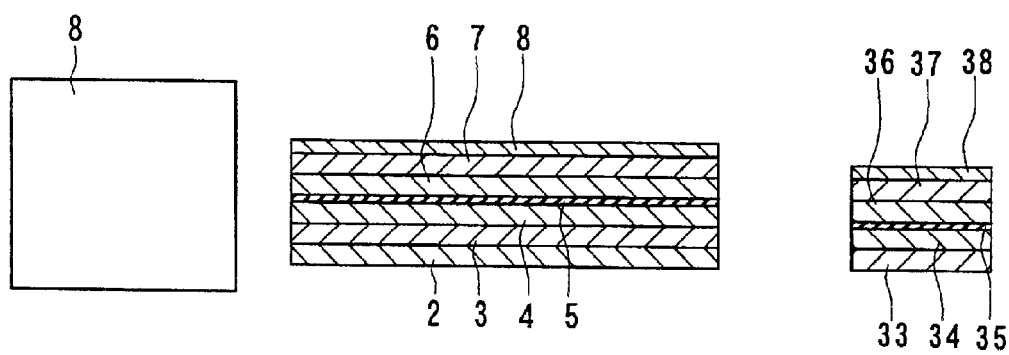
FIG. 14A to FIG. 14C illustrate a step that follows FIG. 13A to FIG. 13C.

Next, as shown in FIG. 13C, a resist mask 51 for forming a patterned thin film that represents an identification symbol is formed on the dummy capping layer 38 by photolithography. At the same time, as shown in FIG. 13A and FIG. 13B, a resist mask 52 is formed over the entire surface of the capping layer 8 by photolithography. Next, the dummy capping layer 38, the dummy pinning layer 37, the dummy upper ferromagnetic layer 36, the dummy tunnel barrier layer 35, the dummy lower ferromagnetic layer 34 and the dummy lower metallic layer 33 are etched through ion milling, for example, using the resist mask 51, to pattern those layers as shown in FIG. 14C. At this time, however, the capping layer 8, the pinning layer 7, the upper ferromagnetic layer 6, the tunnel barrier layer 5, the lower ferromagnetic layer 4 and the lower metallic layer 3 are not etched, as shown in FIG. 14A and FIG. 14B. Then, the resist masks 51 and 52 are removed. The shape of the layers from the dummy capping layer 38 through the dummy lower metallic layer 33 thus patterned by etching represents the identification symbol in the identification section 25.

Next, as shown in FIG. 15A and FIG. 15B, the resist mask 9 for patterning the TMR multi-layer film is formed on the capping layer 8 by photolithography. At the same time, as shown in FIG. 15C, the resist mask 39 is formed by photolithography to cover the dummy capping layer 38 through the dummy lower metallic layer 33. Next, the capping layer 8, the pinning layer 7, the upper ferromagnetic layer 6, the tunnel barrier layer 5 and the lower ferromagnetic layer 4 are selectively etched through ion milling, for example, using the resist mask 9, to pattern the TMR multi-layer film as shown in FIG. 16A and FIG. 16B. At this time, however, the dummy capping layer 38, the dummy pinning layer 37, the dummy upper ferromagnetic layer 36, the dummy tunnel barrier layer 35 and the dummy lower ferromagnetic layer 34 are not etched, as shown in FIG. 16C. Then, the resist masks 9 and 39 are removed.

Next, as shown in FIG. 17A and FIG. 17B, the resist mask 10 is formed on the lower metallic layer 3 and the capping layer 8 by photolithography to cover regions excluding where the hard magnetic layers are to be formed. At the same time, as shown in FIG. 17C, the resist mask 40 is formed by photolithography to cover the dummy capping layer 38 through the dummy lower metallic layer 33.

Next, the capping layer 8, the pinning layer 7, the upper ferromagnetic layer 6, the tunnel barrier layer 5 and the lower ferromagnetic layer 4 are selectively etched through ion milling, for example, using the resist mask 10, so that those layers are patterned as shown in FIG. 18A and FIG. 18B. At this time, however, the dummy capping layer 38, the dummy pinning layer 37, the dummy upper ferromagnetic layer 36, the dummy tunnel barrier layer 35 and the dummy lower ferromagnetic layer 34 are not etched, as shown in FIG. 18C.

Next, as shown in FIG. 18A and FIG. 18B, the hard magnetic layers 11 are formed on regions of the lower metallic layer 3 that are not covered with the resist mask 10. At this time, as shown in FIG. 18C, no hard magnetic layers 11 are formed on the dummy capping layer 38. Then, the resist masks 10 and 40 are lifted off.

Next, as shown in FIG. 19A and FIG. 19B, the resist mask 12 used for defining a shape of the tunnel joint is formed on the capping layer 8 by photolithography. At this time, as shown in FIG. 19C, no resist mask is formed on the dummy capping layer 38.

Next, as shown in FIG. 20A and FIG. 20B, at least the capping layer 8, the pinning layer 7 and the upper ferromagnetic layer 6 are selectively etched through ion milling, for example, using the resist mask 12, to define a shape of the tunnel joint. Here, a position at which the etching is to be stopped is set at a specific position between the top surface of the tunnel barrier layer 5 and any position located partway through the lower ferromagnetic layer 4 in its thickness direction. FIG. 20B illustrates an example in which the position at which the etching is to be stopped is located partway through the lower ferromagnetic layer 4 in its thickness direction. In the etching step for defining the shape of the tunnel joint, as shown in FIG. 20C, in the dummy region at least the dummy capping layer 38, the dummy pinning layer 37 and the dummy upper ferromagnetic layer 36 are etched. In the dummy region, the position at which the etching is to be stopped is set at a specific position between the top surface of the dummy tunnel barrier layer 35 and any position located partway through the dummy lower ferromagnetic layer 34 in its thickness direction, similarly to the case in the region where the thin-film magnetic head element is to be formed. FIG. 20C illustrates an example in which the position at which the etching is to be stopped in the dummy region is located partway through the dummy lower ferromagnetic layer 34 in its thickness direction. As shown in FIG. 20B and FIG. 20C, the thickness (t) of the remaining portion of the lower ferromagnetic layer 4 in its etched region is equal to the thickness (t) of the dummy lower ferromagnetic layer 34 after it is etched.

In the etching step for defining the shape of the tunnel joint, the TMR multi-layer film as the film for the magnetoresistive element and the dummy film are etched at the same time. During the etching, a measurement is performed for identifying elements scattered from the TMR multi-layer film and from the dummy film, using Secondary Ion Mass Spectrometry (SIMS), for example, or by measuring the intensity of the light from the etched films. Based on the measurement results, the material of a film being etched and the depth of the etching in the film are judged on a real-time basis, to thereby control the position at which the etching is to be stopped.

Next, as shown in FIG. 20A to FIG. 20C, the insulating layer 13 is formed over the surface, and the resist mask 12 is then lifted off.

Figure 21A:
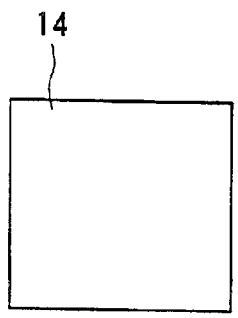
FIG. 21A to FIG. 21C illustrate a step that follows FIG. 20A to FIG. 20C.
Figure 21B:
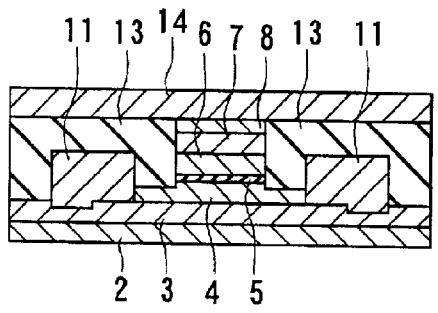
Figure 21C:
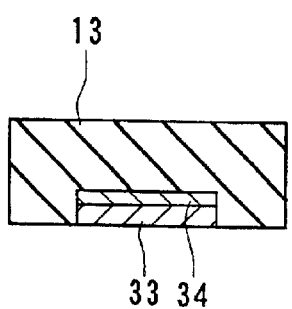

Next, as shown in FIG. 21A and FIG. 21B, the upper electrode layer 14 is formed on the capping layer 8 and the insulating layer 13 in the region where the thin-film magnetic head element is to be formed. At this time, as shown in FIG. 21C, the upper electrode layer 14 is not formed in the dummy region. The read head is thus produced.

In the present embodiment, the dummy lower ferromagnetic layer 34 constitutes the dummy component. The shape of the dummy lower metallic layer 33 and the dummy lower ferromagnetic layer 34 patterned by etching represents an identification symbol in the identification section 25. In the identification section 25, only the insulating layer 13 and the protection layer 17 are formed on the dummy lower ferromagnetic layer 34. Therefore, in the embodiment, the identification symbol represented by the shape of the dummy lower metallic layer 33 and the dummy lower ferromagnetic layer 34 is visually recognized through the protection layer 17 and the insulating layer 13.

In the present embodiment, the position at which the etching for defining the shape of the tunnel joint is to be stopped may be any of the positions shown in FIG. 10A to FIG. 12A and FIG. 10B to FIG. 12B. When the position is fixed at the one shown in FIG. 10A and FIG. 10B or in FIG. 11A and FIG. 11B, the dummy lower ferromagnetic layer 34 and the dummy tunnel barrier layer 35 make up the dummy component, and, the shape of the dummy lower metallic layer 33, the dummy lower ferromagnetic layer 34 and the dummy tunnel barrier layer 35 represents the identification symbol in the identification section 25. When the position is fixed at the one shown in FIG. 12A and FIG. 12B, the dummy lower ferromagnetic layer 34 constitutes the dummy component, and, the shape of the dummy lower metallic layer 33 and the dummy lower ferromagnetic layer 34 represents the identification symbol in the identification section 25.

In the present embodiment, the dummy film or the dummy component is placed in the identification section 25 and the shape of the dummy film or the dummy component represents the identification symbol in the identification section 25. It is therefore possible to prevent the dummy film or the dummy component from affecting the exterior appearance of the thin-film magnetic head.

In the present embodiment, the thickness of the dummy lower metallic layer 33 preferably falls within a range of 5 to 100 nm, or more preferably within a range of 15 to 50 nm, to ensure high visibility of the identification symbol in the identification section 25.

The remainder of the configuration, functions and effects of the embodiment are similar to those of the first embodiment.

An experiment conducted to check the effects of the first and second embodiments mentioned above is now described. The experiment made a comparison of accuracy of the measurement performed in the process of etching to define the shape of the tunnel joint between the cases where the dummy region is provided and not provided.

Figure 22:
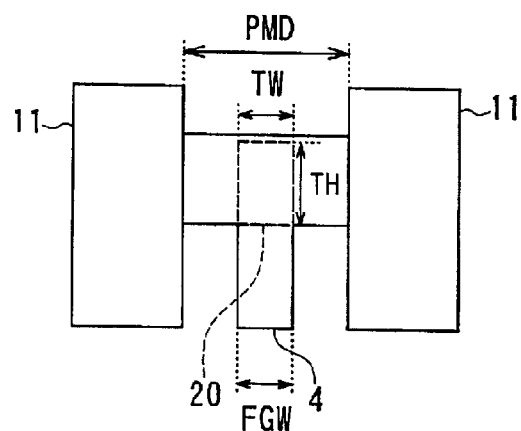
FIG. 22 illustrates a shape of a read head used in an experiment to check the effects of the first or second embodiment.

The shape of the read head used in the experiment is first explained with reference to FIG. 22. FIG. 22 illustrates the tunnel joint 20, the lower ferromagnetic layer 4 and the hard magnetic layers 11 of the read head. In the figure, FGW (Flux Guide Width) is the width of the part of the lower ferromagnetic layer 4 that extends from the tunnel joint 20 to the medium facing surface, PMD (Permanent Magnet Distance) is the length of the part of the lower ferromagnetic layer 4 that extends from the tunnel joint 20 towards both ends in a direction parallel to the medium facing surface, TH (Track Height) is the length of the tunnel joint 20 in a direction perpendicular to the medium facing surface, and TW (Track Width) is the length of the tunnel joint in a direction parallel to the medium facing surface.

For the experiment, a read head of type 1 having the dummy region and a read head of type 2 without the dummy region were prepared. The two types of read heads were the same in dimensions of the parameters shown in FIG. 22. Specifically, FGW was 0.35 $\mu$m, PMD was 0.5 $\mu$m, TH was 0.4 $\mu$m and TW was 0.4 $\mu$m.

In addition, both types of read heads each had a TMR element component composed of: the lower metallic layer 3 made of a 97.5-nm-thick Ta layer; the lower ferromagnetic layer 4 made up of a 3-nm-thick NiFe layer and a 2-nm-thick CoFe layer stacked in this order on the lower metallic layer 3; the tunnel barrier layer 5 made of a 0.7-nm-thick $Al_2O_3$ layer; the upper ferromagnetic layer 6 made of a 3-nm-thick CoFe layer; the pinning layer 7 made of a 30-nm-thick PtMn layer; and the capping layer 8 made of a 5-nm-thick Ta layer.

In the read head of type 1, the dummy region was provided to serve as the identification section 25. In other words, the dummy film having the same composition as that of the TMR element component mentioned above was formed in the identification section 25. The dummy film was so patterned as to represent a symbol for identifying individual thin-film magnetic heads.

In the read head of type 2, a patterned Ti layer having a thickness of 100 nm was formed in the identification section 25 so as to represent a symbol for identifying individual thin-film magnetic heads.

In the process of preparing both types of read heads, ion milling was employed as a method of etching to define the shape of the tunnel joint 20, and the measurement for identifying scattered elements arising from the etching was performed using Secondary Ion Mass Spectrometry (SIMS). The etching was started with the capping layer 8 and stopped partway through the lower ferromagnetic layer 4.

Figure 23:
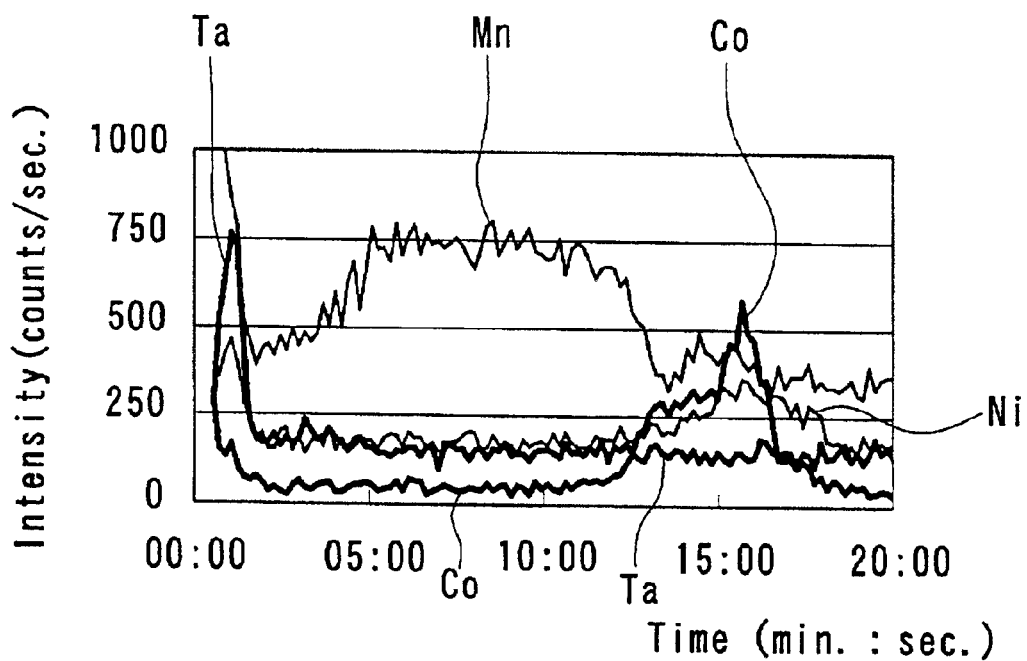
FIG. 23 is a plot showing a result of measurement on a read head of type 1 in an experiment to check the effects of the first or second embodiment.
Figure 24:
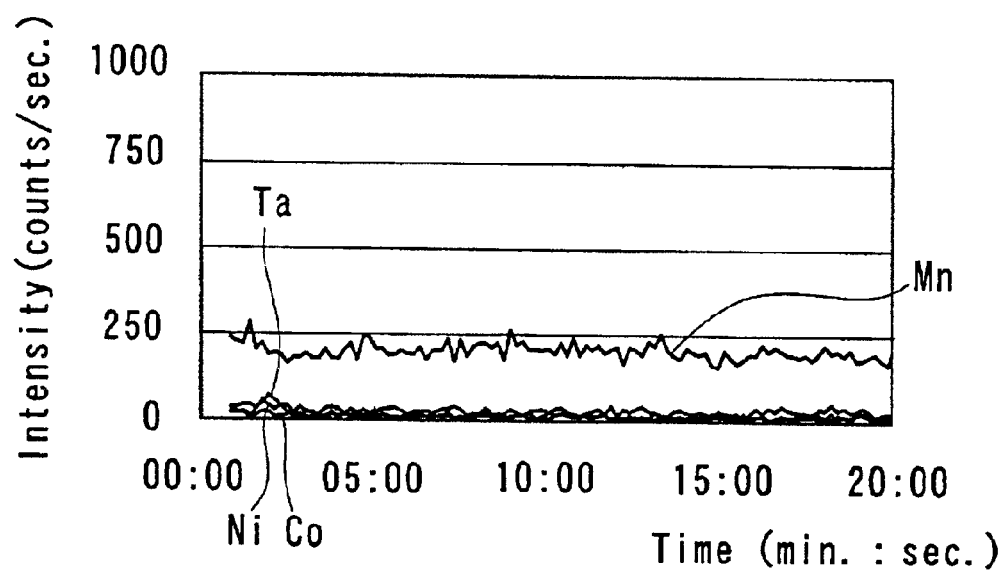
FIG. 24 is a plot showing a result of measurement on a read head of type 2 in an experiment to check the effects of the first or second embodiment.
Figures 31A, 31B:
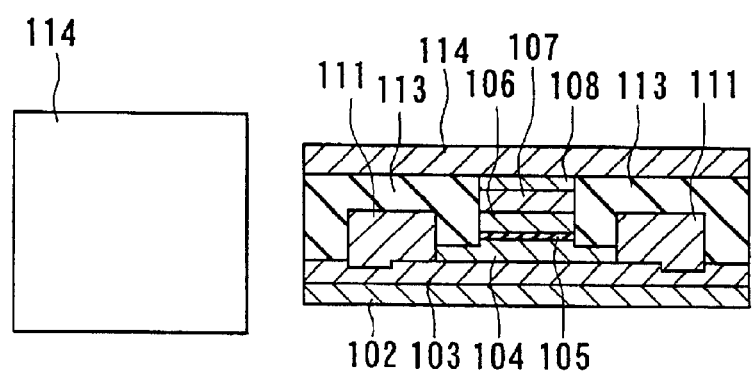
FIG. 31A and FIG. 31B illustrate a step that follows FIG. 30A and FIG. 30B.

FIG. 23 shows the results of the above measurement for the read head of type 1, while FIG. 24 shows the results of the above measurement for the read head of type 2. In FIG. 23 and FIG. 24, the horizontal axis represents the time that lapsed from the start of the etching, whereas the vertical axis represents the signal intensity (counts/second). As shown in FIG. 23, for the read head of type 1, a sufficient signal intensity for recognizing changes in signals of the elements was obtained for Ta, Mn, Co and Ni contained in the capping layer 8, the pinning layer 7, the upper ferromagnetic layer 6 and the lower ferromagnetic layer 4, respectively. In contrast, as shown in FIG. 24, for the read head of type 2, a sufficient signal intensity for recognizing changes in signals of the elements was not obtained for any of the above elements. The results of the experiment show that, for the read head of type 1 it is possible to control the position at which the etching is to be stopped with high precision based on the results of the measurement for identifying elements scattered due to the etching, whereas for the read head of type 2, however, it is difficult to do so.

Next, the read heads of type 1 and type 2 were prepared for 10 wafers each, and the average of output values of the read head for each wafer was obtained. The results are shown in Table 1 and Table 2. In the tables, each value listed for each numbered wafer is the average (in $\mu$Vpp) of outputs of the read head for each wafer concerned. The values under the column "Avg" represent the averages (in $\mu$Vpp) of the above-mentioned averages of outputs of the read heads for the wafers numbered 1 to 10. The symbol $\sigma$ denotes the standard deviation of the average of outputs of the read head for the wafers numbered 1 to 10. $3\sigma/\text{Avg}$ (in %) serves as an index of variations in outputs of read heads among wafers.

TABLE 1

| Wafer No. | 1 | 2 | 3 | 4 | 5 | 6 | 7 |
|---|---|---|---|---|---|---|---|
| Type 1 | 3298 | 3229 | 3319 | 3271 | 3347 | 3175 | 3156 |
| Type 2 | 2981 | 3167 | 2751 | 3057 | 2875 | 2901 | 2539 |

TABLE 2

| Wafer No. | 8 | 9 | 10 | Avg | 3σ/Avg (%) |
|---|---|---|---|---|---|
| Type 1 | 3290 | 3270 | 3193 | 3255 | 5.9 |
| Type 2 | 3198 | 2997 | 2781 | 2925 | 20.6 |

The above tables demonstrate that variations in output of read heads among wafers are reduced by providing the dummy region of the first and second embodiments.

The present invention is not limited to the foregoing embodiments but may be practiced in still other ways. For instance, the dummy film or the dummy component may be provided at a position where it is hidden from the integrated surface by any one of the conductors 24 serving as a patterned thin film formed after the dummy film or the dummy component has been formed. The dummy film or the dummy component may be provided in a plurality of regions where the terminals 23, the conductors 24 and the identification section 25 are provided. Alternatively, the dummy film or the dummy component may be provided in a region in a thin-film magnetic head other than the regions where the terminals 23, the conductors 24 and the identification section 25 are provided.

In the invention, the magnetoresistive element is not limited to a TMR element and may be, for instance, a giant magnetoresistive element with an antiferromagnetic coupling-type multi-layer film or a spin-valve magnetic multi-layer film utilized as the film for the magnetoresistive element.

The method of forming a patterned thin film of the invention is not limited to patterning of the films used for forming the magnetoresistive element. It may be applied to formation of any patterned thin film for a thin-film magnetic head element, as long as the patterned thin film is to be formed by etching a part of a film to be etched having a specific shape in its thickness direction in a specific region within the film.

According to the method of manufacturing a thin-film magnetic head of the invention as described above, the film for the magnetoresistive element and the dummy film are formed in the region where one thin-film magnetic head is to be formed; both of those films are etched at the same time; and a measurement is performed for identifying elements scattered from the film for the magnetoresistive element and from the dummy film due to the etching, so as to control the position at which the etching is to be stopped. Therefore, according to the invention, it is possible to reduce variations in properties of thin-film magnetic heads caused by variations in positions at which etching is stopped, without lowering the production efficiency.

The method of manufacturing a thin-film magnetic head of the invention may include the step of forming a metallic layer that serves as the base on which the film for the magnetoresistive element and the dummy film are formed. In this case, etching conditions for the film for the magnetoresistive element and those for the dummy film are made nearly the same.

In the method of manufacturing a thin-film magnetic head of the invention, the dummy film may be formed at a position where it is hidden from the integrated surface by the patterned thin film formed after the dummy film has been formed. In this case, the dummy film is prevented from affecting the exterior appearance of the thin-film magnetic head.

In the method of manufacturing a thin-film magnetic head of the invention, the shape of the dummy film may represent a symbol for identifying individual thin-film magnetic heads. In this case, the dummy film is prevented from affecting the exterior appearance of the thin-film magnetic head.

In the method of manufacturing a thin-film magnetic head of the invention, the area of the region where the dummy film is formed may fall within a range of 0.05 to 30 percent of the area of the region where one thin-film magnetic head is to be formed. In this case, it is possible to sufficiently raise the accuracy of the measurement for identifying elements scattered from the film for the magnetoresistive element and from the dummy film due to the etching, and it is also possible to provide the dummy film at a position where it will not affect the exterior appearance of the thin-film magnetic head.

In the method of manufacturing a thin-film magnetic head of the invention, the area of the region where the dummy film is formed may fall within a range of 0.1 to 20 percent of the area of the region where one thin-film magnetic head is to be formed. In this case, it is possible to sufficiently raise the accuracy in the measurement for identifying elements scattered from the film for the magnetoresistive element and from the dummy film due to the etching, and to provide the dummy film at a position where it will not affect the exterior appearance of the thin-film magnetic head.

To manufacture the thin-film magnetic head of the invention, when forming the magnetoresistive element by etching a part of the film for the magnetoresistive element, the film for the magnetoresistive element and the dummy film are etched at the same time; and a measurement is performed for identifying elements scattered from the film for the magnetoresistive element and from the dummy film due to the etching, so as to control the position at which the etching is to be stopped. According to the thin-film magnetic head of the invention thus manufactured, it is possible to perform the above-mentioned measurement with high precision, and to thereby control the position at which the etching is to be stopped with high precision. Therefore, according to the invention, it is possible to reduce variations in properties of thin-film magnetic heads caused by variations in positions at which etching is stopped, without lowering the production efficiency.

The thin-film magnetic head of the invention may be provided with a metallic layer that serves as the base on which the film for the magnetoresistive element and the dummy film are formed. In this case, etching conditions for the film for the magnetoresistive element and those for the dummy film are made nearly the same.

In the thin-film magnetic head of the invention, the dummy component may be provided at a position where it is hidden from the integrated surface by the patterned thin film formed after the dummy component has been formed. In this case, the dummy component is prevented from affecting the exterior appearance of the thin-film magnetic head.

In the thin-film magnetic head of the invention, the shape of the dummy component may represent a symbol for identifying individual thin-film magnetic heads. In this case, the dummy component is prevented from affecting the exterior appearance of the thin-film magnetic head.

In the thin-film magnetic head of the invention, the area of the region where the dummy component is provided may fall within a range of 0.05 to 30 percent of the area of a surface of the thin-film magnetic head on which the magnetoresistive element and the dummy component are provided. In this case, it is possible to sufficiently raise the accuracy of the measurement for identifying elements scattered from the film for the magnetoresistive element and from the dummy film due to the etching, and it is also possible to provide the dummy component at a position where it will not affect the exterior appearance of the thin-film magnetic head.

In the thin-film magnetic head of the invention, the area of the region where the dummy component is provided may fall within a range of 0.1 to 20 percent of the area of a surface of the thin-film magnetic head on which the magnetoresistive element and the dummy component are provided. In this case, it is possible to sufficiently raise the accuracy of the measurement for identifying elements scattered from the film for the magnetoresistive element and from the dummy film due to the etching, and it is also possible to provide the dummy component at a position where it will not affect the exterior appearance of the thin-film magnetic head.

According to the method of forming a patterned thin film for a thin-film magnetic head of the invention, the film to be etched and the dummy film are formed in the region where one thin-film magnetic head is to be formed; both of those films are etched at the same time; and a measurement is performed for identifying elements scattered from the film to be etched and from the dummy film due to the etching, so as to control the position at which the etching is to be stopped. Therefore, according to the invention, it is possible to reduce variations in properties of thin-film magnetic heads caused by variations in positions at which etching is stopped, without lowering the production efficiency.

Obviously many modifications and variations of the present invention are possible in light of the above teachings. It is therefore to be understood that within the scope of the appended claims the invention may be practiced other than as specifically described.

What is claimed is:

1. A thin-film magnetic head having a magnetoresistive element and a dummy component that are formed on a base, wherein:

the magnetoresistive element is formed by etching a part of a film for the magnetoresistive element, the film having a specific shape and being used for forming the magnetoresistive element;

the film for the magnetoresistive element includes a first region and a second region;

the film is not etched in the first region but etched in the second region partway in a direction from its top surface toward the base;

the dummy component is formed by etching a dummy film in its entire region partway in a direction from its top surface toward the base, the dummy film having a composition the same as that of the film for the magnetoresistive element and not being used for forming the magnetoresistive element; and one of surfaces of the dummy component farther from the base is located at a position corresponding to a position of a surface of the film for the magnetoresistive element in the second region that is obtained by the etching, as viewed in a direction of thickness of the magnetoresistive element.

2. A thin-film magnetic head according to claim 1, wherein the magnetoresistive element includes a first magnetic layer, a tunnel barrier layer an a second magnetic layer that are stacked in this order on the base.

3. A thin-film magnetic head according to claim 2, wherein the one of the surfaces of the dummy component farther from the base is located at a position corresponding to a boundary between the second magnetic layer and the tunnel barrier layer of the magnetoresistive element, as viewed in a direction of thickness of the magnetoresistive element.

4. A thin-film magnetic head according to claim 2, wherein the one of the surfaces of the dummy component farther from the base is located at a position corresponding to a position located partway through the tunnel barrier layer of the magnetoresistive element, as viewed in a direction of thickness of the magnetoresistive element.

5. A thin-film magnetic head according to claim 2, wherein the one of the surfaces of the dummy component farther from the base is located at a position corresponding to a boundary between the tunnel barrier layer and the first magnetic layer of the magnetoresistive element, as viewed in a direction of thickness of the magnetoresistive element.

6. A thin-film magnetic head according to claim 2, wherein the one of the surfaces of the dummy component farther from the base is located at a position corresponding to a position located partway through the first magnetic layer of the magnetoresistive element, as viewed in a direction of thickness of the magnetoresistive element.

7. A thin-film magnetic head according to claim 1, further having a metallic layer that serves as the base on which the magnetoresistive element and the dummy component are formed.

8. A thin-film magnetic head according to claim 7, wherein the metallic layer is formed of a non-magnetic metal.

9. A thin-film magnetic head according to claim 1, wherein the dummy component is formed at a position where it is hidden from an integrated surface b a patterned thin film formed after the dummy component has been formed.

10. A thin-film magnetic head according to claim 1, wherein the dummy component has a shape that represents a symbol for identifying each individual thin-film magnetic head.

11. A thin-film magnetic head according to claim 1, wherein a region in which the dummy component is provided has an area that falls within a range of 0.05 to 30 percent of the area of a surface of the thin-film magnetic head on which the magnetoresistive element and the dummy component are provided.

12. A thin-film magnetic head according to claim 1, wherein a region in which the dummy component is provided has an area that falls within a range of 0.1 to 20 percent of the area of a surface of the thin-film magnetic head on which the magnetoresistive element and the dummy component are provided.

* * * * *